May 27, 1969

A. M. A. HEUNKS ET AL 3,446,601

DEVICE FOR PREPARING UREA

Filed Dec. 14, 1965

United States Patent Office 3,446,601
Patented May 27, 1969

3,446,601
DEVICE FOR PREPARING UREA
Antonius M. A. Heunks, Geleen, Franciscus A. Kars, Sittard, and Gerrit Hofenk, Geleen, Netherlands, assignors to Stamicarbon N.V., Heerlen, Netherlands
Filed Dec. 14, 1965, Ser. No. 513,722
Claims priority, application Netherlands, Dec. 16, 1964, 6414630
Int. Cl. B01d 3/34, 3/00; C07c 127/10
U.S. Cl. 23—263
5 Claims The present invention relates to a process and apparatus for the synthesis of urea from ammonia and carbon dioxide.

When ammonia and carbon dioxide are reacted together, under suitable conditions of temperature and pressure, urea is formed, via the intermediate ammonium carbamate formation, according to the reaction equations:

$$2NH_3 + CO_2 \rightarrow NH_2COONH_4 + 27 \text{ kcal./mole}$$
$$NH_2COONH_4 \rightleftharpoons CO(NH_2)_2 + H_2O - 3.7 \text{ kcal./mole}$$

The first reaction proceeds to completion and is highly exothermic, while the second reaction is an equilibrium reaction in which approximately the major part of the ammonium carbamate changes into urea. This second reaction is weakly endothermic.

To maintain the usual reaction temperature for the production of ammonium carbamate, e.g., a reaction temperature of 160–180° C., it is necessary to eliminate the excess heat of reaction. A common way of eliminating excess reaction heat is by means of heat exchange with a cooling agent. However, such cooling by means of a cooling agent in the high pressure reactor in which the ammonium carbamate is synthesized has produced a problem in providing a sufficiently large cooling area without exerting undue resistance to flow in the reactor.

An ammonium carbamate cooler previously used which overcomes this problem utilizes a bundle of pipe shaped cooling elements, each element consisting of two concentric pipes, the outer one of which is sealed at the end inserted into the reactor. During operation, the cooling liquid flows down through the inner pipe and then up to the annular space between the inner and outer pipes. Heat transfer from the reaction medium to the cooling agent is through the wall of the outer pipe. The cooling liquid previously used was water, thus, in effect, turning the ammonium carbamate cooler into a steam generator in which the absorbed heat converts the water fed into the cooler into low pressure steam, i.e., steam of about 3.5 atmospheres pressure.

The process just described using water as a cooling medium has the drawback that the steam produced has only a limited use, due to its relatively low pressure, either within or outside the urea plant. Such steam has found limited use in heating urea solutions to decompose any ammonium carbamate contained in the solution, and also in concentrating urea solutions to an essentially water-free urea melt. One disadvantage of the use of this steam in the urea plant is that essentially the same amount of heat has to be transferred twice, i.e., the heat is first ransferred to generate steam in the ammonium carbamate cooler and secondly the steam so produced is condensed, thus releasing heat for heating purposes. The total heat transferring area required is consequently rather large and therefore expensive.

French Patents 958,503 and 1,328,681 describe a process for the direct utilization in a heat exchanger of the heat released in the formation of ammonium carbamate for heating urea solutions that contain ammonium carbamate and are under a lower pressure, thereby decomposing the ammonium carbamate dissolved in the urea solution. In these patented processes, the heat exchanger is of a spiral or coil construction, which has the disadvantages that the liquid passed therethrough must overcome high resistance to flow, with a consequential large pressure drop between the feed and discharge ends of the heat exchanger. As a consequence, the urea solution fed to such a heat exchanger first remains, at a certain cooling stage, under a pressure which is too high to allow ammonium carbamate to decompose into gaseous ammonia and carbon dioxide. As no gas is formed, the flow rate will be comparatively low, as a result of which the heat transfer coefficient will be low, thereby requiring the use of a large area of heat exchange. This large area of heat exchange in turn requires a larger heat exchanger volume which results in a longer residence time of the urea solution at a high temperature, which increases the undesirable formation of biuret. Another disadvantage of the large pressure drop in a spiral or coil heat exchanger is that it is not possible, without the installation of additional pumps, to rectify the gaseous mixture of ammonia, carbon dioxide and water vapor obtained from the urea solution in a column in countercurrent flow to fresh, nonpreheated ammonium carbamate-containing urea solution to reduce the water content of the gaseous mixture. Consequently, when such a spiral or coil heat exchanger was used, the prior art was generally forced to use a simple gas-liquid separation without rectification.

Accordingly, it is an object of this invention to provide a process for producing urea wherein the heat of formation of ammonium carbamate is removed by means of a urea solution cooling medium passing through a heat exchanger with a low pressure drop. It is another object of this invention to provide a process for the synthesis of urea wherein an ammonium carbamate reactor is cooled by a heat exchanger utilizing a urea solution as the cooling medium and wherein freshly formed urea solution is stripped in a column in countercurrent flow to fresh carbon dioxide gas and without the necessity of providing additional pumps. It is an additional object of this invention to provide an apparatus for the synthesis of urea which is essentially water- and ammonium carbamate-free and wherein the heat of reaction in an autoclave is removed through a concentric pipe heat exchanger utilizing a urea heat exchanger cooling medium. It is a further object of this invention to provide apparatus for the synthesis of urea from ammonia and carbon dioxide, with intermediate formation of ammonium carbamate, wherein the heat of reaction of ammonium carbamate is removed through a concentric pipe heat exchanger by means of a urea solution cooling medium. Still further objectives and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

The above objects may now be realized in a process for preparing urea with an improved economy of heat and with simpler apparatus than previously used wherein the heat released in the solution of ammonium carbamate is directly utilized for heating urea solutions. The urea solutions are used as the cooling medium in an ammonium carbamate cooler of the concentric pipe type described above, that is, an ammonium carbamate cooler consisting of a bundle of pipe-shaped cooling elements, each of which consist of two concentric pipes, the outer one of which is so sealed that during operation the cooling liquid flows in and through a space between the outer and inner pipe. When such an ammonium carbamate cooler is used to exchange heat between the heated ammonium carbamate synthesis melt to be cooled and the urea solution (whether or not containing ammonium carbamate) to be heated, the drawbacks of the heat exchangers used previously in urea synthesis processes are obviated. That is, a relatively small heat transfer area with a low pressure drop is used in an improved process in which rectification with a gaseous mixture of ammonia and carbon dioxide may be obtained without the installation of additional pumps.

During operation, this type of cooler has a particularly small pressure difference because vapor bubbles immediately form in the lower parts of the pipes, imparting a high linear velocity to the upward flowing urea solution and giving a favorable heat transfer. In addition, advantage is taken of the comparatively low temperatures at which urea solutions boil, so that there is consequently a very great difference in temperature between the material to be cooled and the cooling medium, which promotes the heat transfer, so that a smaller heat-transferring area will suffice.

This method of transferring the heat released in the carbamate formation to urea solutions is particularly suitable to be used with urea solutions low in ammonium carbamate, such as are obtained in a urea synthesis, known in itself, in which a large part of the unconverted ammonium carbamate is expelled from the urea synthesis melt in a stripping operation with carbon dioxide at a higher pressure. The gas mixture containing ammonia and carbon dioxide discharged from this operation is returned to the ammonium carbamate synthesis. The resulting urea solution low in ammonium carbamate, e.g., 9% or less ammonium carbamate, can then be freed of ammonium carbamate remaining in solution by releasing the pressure to atmospheric or slightly higher pressure, e.g., 3 atm., in a rectifying column and heating the solution according to the invention in an ammonium carbamate cooler. The urea solution thus obtained can subsequently be concentrated at a subatmospheric pressure by again heating it according to the invention in the ammonium carbamate cooler.

The invention will be more fully understood by reference to the accompanying drawings in which.

Figure 1:
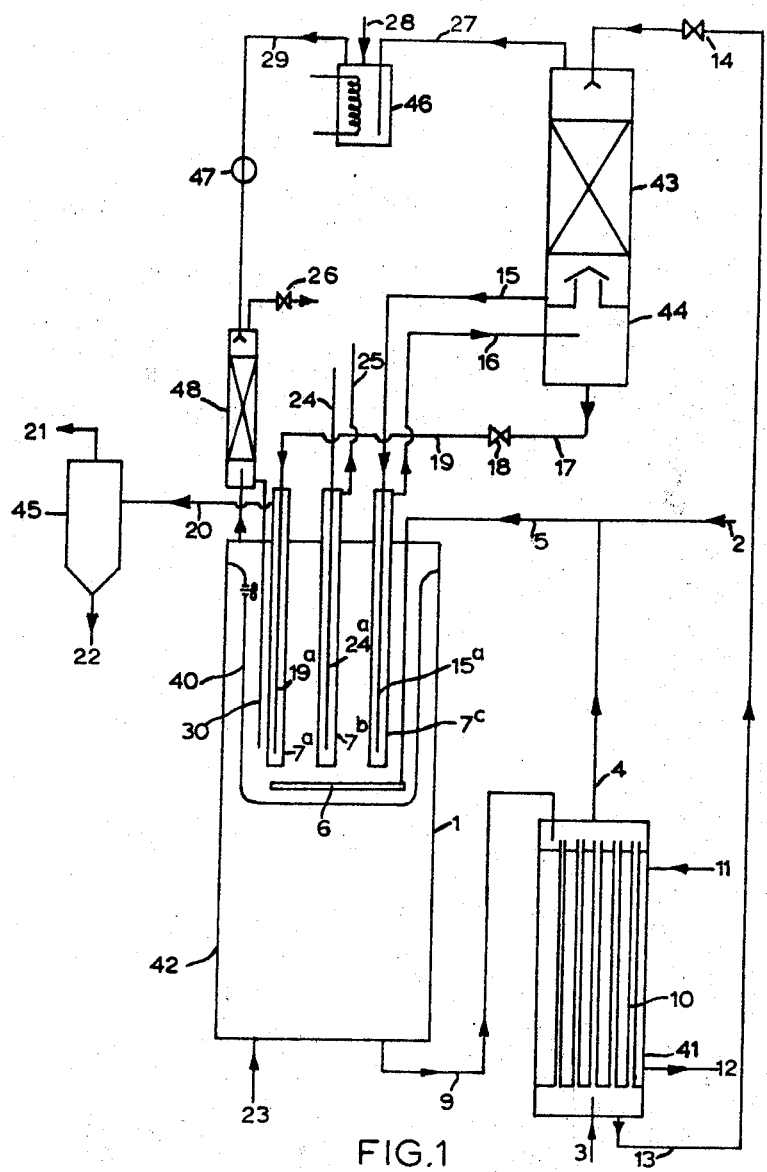
FIGURE 1 is a schematic diagram for an apparatus for synthesizing urea from ammonia and carbon dioxide in which heat exchange is effected in the ammonium carbamate reactor and in which the major proportion of the ammonium carbamate still contained in the urea solution discharged from the autoclave is expelled in a stripping operation at high pressure with carbon dioxide.

More specifically, in the process described in FIGURE 1, an autoclave 1 has an upper portion which is provided with a carbamate reactor 40. Liquid ammonia is fed to the ammonium carbamate reactor 40 through conduits 2 and 5 and carbon dioxide is introduced into the reactor through conduit 3, stripping column 41 and conduits 4 and 5. The ammonia and carbon dioxide mixture is uniformly distributed in the bottom part of the carbamate reactor 40 by an apertured distributing element, or sparger, 6. The resultant ammonium carbamate, part of which changes into urea while in the carbamate reactor 40, flows upwardly along the cooling elements 7$^a$, 7$^b$ and 7$^c$ to flow through outlets 8 into the urea autoclave 1 wherein, in the bottom part 42, the further conversion of ammonium carbamate to urea is effected.

The resultant urea synthesis solution, still containing an appreciable amount of ammonium carbamate, is passed through conduit 9 into the top of stripping column 41 where the solution uniformly flows down as a firm along the inner walls of pipes 10. The ammonium carbamate is stripped by carbon dioxide supplied through conduit 3. The pipes 10 are heated with steam supplied through conduit 11. Condensed water is discharged through conduit 12. The lower ends of pipes 10 are surrounded by condensed water so that they are not appreciably heated by the steam. The heat in stripping column 41 causes the major proportion of the ammonium carbamate dissolved in the urea synthesis solution to decompose into gaseous ammonia and carbon dioxide. These gases are entrained by the carbon dioxide introduced through conduit 3 and are led to the ammonium carbamate reactor through conduits 4 and 5. The urea solution leaving stripping column 41, freed of most of the ammonium carbamate originally contained in it, is passed through conduit 13 into the top of rectifying column 43. Throttle valve 14 in conduit 13 reduces the pressure of the urea solution from the synthesis pressure to the pressure in the rectifying column 43. The rectifying column 43 is mounted over a gas-liquid separator 44. The urea solution collected in the bottom part of the rectifying column 43 flows through conduit 15 and into a heat exchanger bundle inserted into carbamate reactor 40. The urea solution flows through inner pipe 15$^a$ and thence to the bottom of outer pipe 7$^c$, from where, after absorption of heat and decomposition of any ammonium carbamate still dissolved in the solution in the gaseous ammonia and carbon dioxide, the solution flows up through the annular space between inner pipe 15$^a$ and outer pipe 7$^c$ and is discharged through conduit 16 into gas-liquid separator 44. The urea solution and the gases formed in the decomposition of ammonium carbamate are separated in the gas-liquid separator 44. The hot gases flow up through rectifying column 43 in contact with the solution supplied to the column through conduit 13. The urea solution is pre-heated by the condensation of part of the water vapor contained in the gases. The operation of heating the urea solution at a pressure of only a few atmospheres effectively removes the remainder of the ammonium carbamate in the solution.

The urea solution, which is essentially free of ammonium carbamate, flowing into the bottom of gas-liquid separator 44 is passed through conduit 17, throttle valve 18 and conduit 19 into the inner pipes 19$^a$ and a heat exchanger bundle located in the carbamate reactor 40. The throttle valve further reduces the pressure of the urea solution, preferably to a subatmospheric pressure. The urea solution is concentrated at this subatmospheric pressure by the heating in the cooling element and the resulting mixture of liquid urea and water vapor is passed through conduit 20 into separator 45. The water vapor is discharged through conduit 21, which is connected to a vacuum condenser, while the concentrated urea melt, low in water content, may be passed through conduit 22 to a prilling tower or to storage.

The remainder of the heat to be removed from ammonium carbamate reactor 40 to keep the reaction temperature within the desired range is absorbed by cooling water flowing through conduit 24, innner pipe 24$^a$, outer pipe 7$^b$ and the resulting steam is discharged through conduit 25.

The gaseous mixture of ammonia and carbon dioxide, containing little water vapor, is discharged from the top of rectifying column 43 through conduit 27 into condenser 46, equipped with cooling means, for example, a cooling spiral. The gases are condensed in condenser 46 with, if necessary, the addition of additional water supplied through conduit 28. The resulting ammonium carbamate solution is drawn through conduit 29 by pump 47, which raises the pressure of the solution to the synthesis pressure. The solution is then passed through the top of washing column 48 where the inert gases introduced into the system with the ammonia and carbon dioxide feed streams are discharged from the top of the carbamate reactor 40 and washed to recover any entrained ammonia. The washing liquid is passed from washing column 48 through conduit 30 into the bottom of the carbamate reactor 40. The inert gases passing through washing column 48 are vented through a vent conduit 26, provided with a valve.

For the sake of simplicity, only three cooling elements or pipe tube units have been illustrated inside of carbamate reactor 40 in FIGURE 1. It should be noted that in actual practice, the heat exchanger may consist of even hundreds of cooling elements, so that each element illustrated actually represents a bundle of numerous cooling elements. An additional advantage of the urea synthesis apparatus shown schematically in FIGURE 1 is that it is of very compact construction with a resultant low cost of investment.

With the low resistance to flow offered the reaction mixture in the ammonium carbamate cooler and in the stripping column permit the flow, without the installation of additional pumps (over the ammonia and carbon dioxide compressors by means of which the gases are forced into the reactor under synthesis pressure and pump 47), of the ammonium carbamate melt into the urea reactor 42 and the flow of the urea synthesis solution at the synthesis pressure, e.g., 125 atmospheres, from the autoclave to the stripping column and then to the rectifying column. The pressure drop across throttle valve 14, the gases formed in the cooling elements as a result of the decomposition of ammonium carbamate into ammonia and carbon dioxide gases, and the formation of water vapor automatically provide a lifting reaction for the transport of the urea solution through the cooling elements to the gas-liquid separator 44 and for the transport of gases from the rectifying column 43 to the condenser 46.

Figure 2:
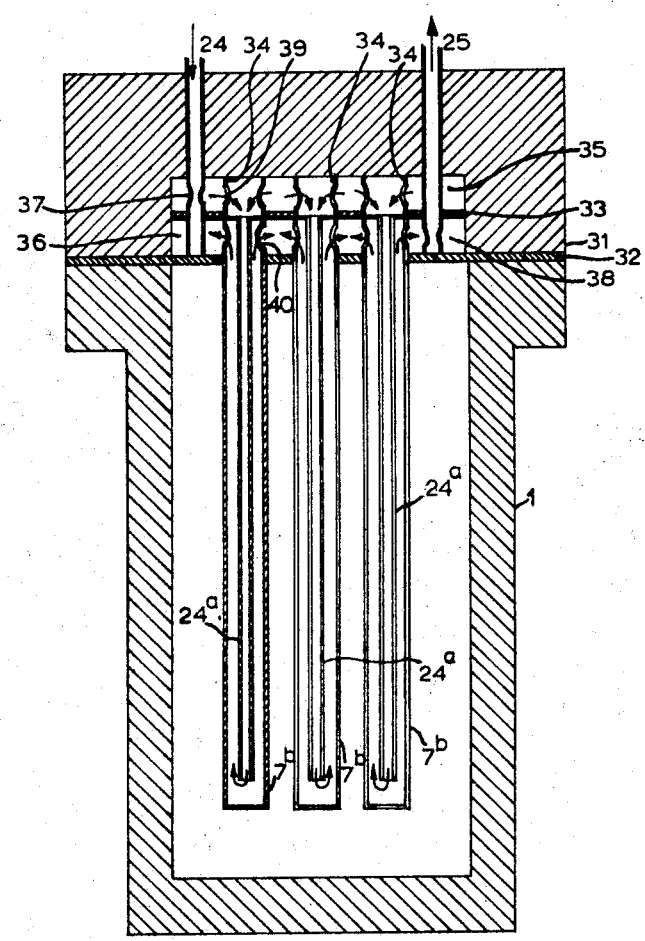
FIGURE 2 is a longitudinal cross-sectional view of a preferred embodiment of this invention in which the cooling tube bundles of the heat exchanger are fitted in the autoclave in a novel and improved method.

The preferred embodiment of the present invention is illustrated in FIGURE 2. In previously known heat exchangers composed of a bundle of cooling elements, each element consisting of essentially two concentric pipes, the cooling elements are passed through perforations in the cover of the autoclave. As such heat exchangers are composed of hundreds of cooling elements, the cover is considerably weakened by the numerous perforations. To compensate for this weakening of the cover, it must be made much heavier than it would be without perforations. In the preferred embodiment illustrated by FIGURE 2, this drawback of unduly weakening the autoclave cover has been greatly reduced or eliminated. As illustrated, the autoclave cover has only a few perforations. The bundle of pipes is connected to the cover by means of a pipe plate.

The upper end of the urea synthesis column is fitted with a flange to which a cover 31 may be bonded. (For simplicity, carbamate reactor 40, outlet opening 8, sparger 6, and certain feed and discharge lines are not shown.)

The cover 31 has perforations through which cooling supply pipe 24 and discharge pipe 25 are passed. Two chambers 35 and 36 are formed in the cover head by means of two pipe plates 32 and 33. The inner pipe $24^a$ of the cooling elements are fitted to the pipe plate 33. Outer pipes $7^b$ are welded to both pipe plate 32 and pipe plate 33 and open into chamber 36. In addition, outer pipes $7^b$ are elongated by extensions 34 so that the outer pipes $7^b$, in effect, press against the lower side of the cover. By means of this construction a large difference between the pressures on different sides of the pipe plate 32 may be tolerated without the necessity of giving the pipe plate 32 and extra heavy construction. For example, a pressure of 100 to 200 atmospheres may prevail in the urea synthesis column, whereas the pressure in chambers 35 and 36 may be under 10 atmospheres. The cooling agent, e.g., water, is supplied through conduit 24 and is passed through opening 37 into chamber 35, wherein it is distributed over the inner pipes $24^a$ through opening 39 in outer pipe extensions 34. The cooling agent passes down through inner pipe $34^a$ and then rises in the space between the walls of inner pipe $24^a$ and outer pipe $7^b$, during which passage steam may be formed. The water-steam mixture then passes through opening 40 into chamber 36 and this is discharged through opening 38 into and through conduit 25.

Since it is desired not only to cool with water but also to utilize the reaction heat released in the ammonium carbamate reactor 40 to decompose ammonium carbamate contained in a urea solution and/or for the evaporation of urea solutions, the chambers 35 and 36 will be divided into compartments by means of partitions, each compartment being provided with separate supply and discharge conduits.

Further details of the process variables involved in the synthesis of urea from ammonia and carbon dioxide will be found in Encyclopedia of Chemical Technology, Kirk-Othmer, volume 14, pp. 458–466, Interscience Publishers, Inc., New York, 1955, the disclosure of which is hereby incorporated by reference.

EXAMPLE I

In a urea process apparatus similar to that illustrated in FIGURE 1, the urea synthesis column had an internal diameter of 1100 mm. and the carbamate cooler consisted of a bundle of 500 cooling elements, each element consisting of concentric pipes, the outer pipe having an outer diameter of 2.5 cm. and a length of 6 meters. Of these cooling elements, 50 are connected to a compartment to which a urea solution from a rectifying column is supplied, 235 are connected to a compartment to which water is supplied as a cooling agent and 215 are connected to a compartment into which a urea solution, low in ammonium carbamate content, to be concentrated is fed.

EXAMPLE II

The urea synthesis column described in Example 1 was used to synthesize urea from ammonia and carbon dioxide via the intermediate product ammonium carbamate. 12,500 pounds per hour of ammonia and 16,200 pounds per hour of carbon dioxide were fed to an autoclave which was at a temperature of 172° C. and a pressure of 125 atmospheres. The resulting urea solution, containing an appreciable amount of ammonium carbamate, was passed through a stripping column wherein the solution temperature was raised to 200° C. The gases produced by decomposition were stripped by the carbon dioxide feed stream. The liquid passing through the stripping column, containing 9% ammonium carbamate, was introduced into a rectifying column after passing through a throttle valve which reduced the pressure of the solution to 3 atmospheres. The liquid passing through the rectifying column, after being heated in the carbamate reactor by means of a concentric pipe heat exchanger, passed into a gas-liquid separator. The gas leaving the separator passes up the rectifying column in countercurrent flow to the liquid flow in the column. The liquid leaving the gas-liquid separator passed through a throttle valve which reduced the pressure of the liquid to 0.4 atmosphere and thence to another concentric pipe heat exchanger located in the carbamate reactor portion of the autoclave, wherein most of the water in the solution was vaporized. The liquid-gas mixture was passed to a second liquid-gas separator and about 31,000 pounds per hour of an essentially pure concentrated urea solution of 92% by weight was recovered.

The gas passing overhead from the rectifying column was condensed and pumped into a washing column, where it passed in countercurrent flow to inert gases from the top of the ammonium carbamate reactor portion. The liquid passing through the washing column was returned to the bottom of the ammonium carbamate reactor portion.

What is claimed is:

1. An apparatus for synthesizing urea from ammonia and carbon dioxide by the intermediate formation of ammonium carbamate, comprising a synthesis autoclave, comprising an ammonium carbamate reactor portion and a urea reaction portion separated by a wall, provided with a supply conduit for the reaction mixture and at least one series of heat exchanger bundles in the ammonium carbamate reactor portion, each heat exchanger bundle comprising elements consisting of concentric inner and outer pipes, the outer pipe sealed at the end within the ammonium carbamate reactor portion and the inner pipe passageway in connection with an annular space between the inner pipe and the outer pipe near the sealed end of the outer pipe, overflow openings in the wall of the ammonium carbamate reactor portion allowing passage into the urea reaction portion, a stripping column communicating with the urea reaction portion of the synthesis autoclave, a conduit for the supply of stripping gas and a discharge conduit for the gas released in the stripping column communicating with the ammonium carbamate reactor portion attached to the stripping column, a rectifying column and a gas-liquid separator, a conduit, provided with a throttle valve, connecting the stripping column and the rectifying column, the rectifying column communicating with the gas-liquid separator, a conduit connecting the rectifying column to a series of inner pipes in the heat exchanger in the carbamate reactor, a conduit from the annular space between the inner and outer pipes of the heat exchangers to the gas-liquid separator, and a discharge conduit fitted to the bottom of the gas-liquid separator.

2. The apparatus as claimed in claim 1 wherein the discharge conduit fitted to the bottom of the gas-liquid separator is provided with a throttle valve and communicates with the inner pipes of a second series of heat exchanger bundles in the ammonium carbamate reactor portion, the apparatus additionally includes a second liquid-gas separator and the annular space between the inner and outer pipes of the second series of heat exchanger bundles is connected to a discharge conduit leading to the second liquid-gas separator.

3. The apparatus as claimed in claim 2 wherein the heat exchanger bundles in the ammonium carbamate reactor portion are fitted to pipe plates side the carbamate reactor, the autoclave has a cover at its upper end, and the upper ends of the heat exchanger outer pipes are extended to be in contact with the inside surface of the cover of the autoclave.

4. The apparatus as claimed in claim 3, further including a condenser, a conduit connecting the rectifying column to the condenser, a washing column for countercurrent gas-liquid contact, a conduit containing a pump and connecting the condenser to the washing column, and a conduit connecting the top of the ammonium carbamate reactor portion to the washing column and a vent discharge conduit on the washing column.

5. The apparatus as claimed in claim 3 wherein the autoclave has a cover with an inner concave surface, the heat exchanger bundles in the ammonium carbamate reactor portion are fitted to two pipe plates, the walls and the top of the cover and the pipe plates together define a feed chamber and a discharge chamber, the feed chamber in open communication with the inner pipes of a series of heat exchanger bundles, the discharge chamber in open communication with the annular space between the inner and outer pipes of a series of heat exchanger bundles, at least one feed conduit from the rectifying column opening into the feed chamber, at least one discharge conduit leading to the gas-liquid separator opening into the discharge chamber, whereby solution introduced through the fed conduit passes into the feed chamber and thence through the inner pipes, through the annular space between the inner and outer pipes into the discharge chamber, and then passes out of the autoclave through the discharge conduit.

References Cited
UNITED STATES PATENTS

| | | | |
|---|---|---|---|
| 3,258,486 | 6/1966 | Cook | 260—555 |
| 3,284,537 | 11/1966 | Webb | 260—555 |

OTHER REFERENCES

Dewling, W.L.E.: "Urea Manufacture at the I. G. Farbenindustrie Plant at Oppan (Fiat Final Report #889).

JAMES H. TAYMAN, JR., *Primary Examiner.*

U.S. Cl. X.R.

23—285; 162—142; 260—555